(12) United States Patent
Huang et al.

(10) Patent No.: US 7,841,473 B2
(45) Date of Patent: Nov. 30, 2010

(54) ELECTRONIC DEVICE STORAGE/CARRYING CASE HAVING A SUPPORT FUNCTION

(76) Inventors: Wen-Hung Huang, 3F., No. 12, Alley 6, Lane 207, Sec. 3, Jincheng Rd., Taipei County, Tucheng City (TW); Guan-De Liou, 2F., No. 24, Lane 120, Bangka Blvd.,Wanhua District, Taipei City 108 (TW); Stephen Tsai, 3F.-1, No. 187, Jhangshu 1st Rd., Taipei County 221, Sijhih City (TW)

( * ) Notice: Subject to any disclaimer, the term of this patent is extended or adjusted under 35 U.S.C. 154(b) by 0 days.

(21) Appl. No.: 12/433,653

(22) Filed: Apr. 30, 2009

(65) Prior Publication Data
US 2010/0116710 A1    May 13, 2010

(30) Foreign Application Priority Data
Nov. 13, 2008 (TW) .............................. 97143890 A

(51) Int. Cl.
*B65D 5/50* (2006.01)
(52) U.S. Cl. .................. 206/759; 206/576; 206/320; 206/762
(58) Field of Classification Search .............. 206/759, 206/755, 45.2, 765, 45.24, 45.23, 45.28, 206/776, 305, 576, 320, 762; 361/679.27; 248/346.01, 676, 688, 454, 456; 190/13 H, 190/17, 16, 15 R, 104, 105, 115, 117
See application file for complete search history.

(56) References Cited
U.S. PATENT DOCUMENTS

| | | | | |
|---|---|---|---|---|
| 3,239,297 A * | 3/1966 | Bosko et al. | ................ | 312/231 |
| 3,991,967 A * | 11/1976 | Sack | ........................... | 248/448 |
| 4,116,413 A * | 9/1978 | Andersen | .................... | 248/451 |
| 4,896,252 A * | 1/1990 | Stewart | ....................... | 362/98 |
| 4,978,096 A * | 12/1990 | Struckmann | ................ | 248/451 |
| 6,199,816 B1 * | 3/2001 | Case | ........................... | 248/460 |
| 7,073,449 B2 * | 7/2006 | Pipkin | ......................... | 108/44 |
| 2007/0113458 A1 * | 5/2007 | Wang et al. | ................... | 40/753 |

\* cited by examiner

*Primary Examiner*—Mickey Yu
*Assistant Examiner*—Jenine M Pagan

(57) ABSTRACT

An electronic device storage/carrying case is adapted for storing and supporting an electronic device, and includes a case body, a first supporting component, and a second supporting component. The case body defines a storage space for storing the electronic device, and includes a front wall formed with an opening. The first supporting component is pivoted to the case body and is pivotable upwardly relative to the case body to a propping position for supporting the electronic device, and downwardly relative to the case body to a storing position, where the first supporting component is stored in the case body. The second supporting component is connected movably to the case body and is movable between a carrying position, where the second supporting component extends outwardly of the case body via the opening in the front wall, and a supporting position, where the second supporting component is disposed in the storage space.

14 Claims, 3 Drawing Sheets

ELECTRONIC DEVICE STORAGE/CARRYING CASE HAVING A SUPPORT FUNCTION

CROSS-REFERENCE TO RELATED APPLICATION

This application claims priority of Taiwanese Application No. 097143890, filed on Nov. 13, 2008.

BACKGROUND OF THE INVENTION

1. Field of the Invention

The present invention relates to an electronic device storage/carrying case having a support function, more particularly to an electronic device storage/carrying case for storing and supporting an electronic device.

2. Description of the Related Art

U.S. Pat. No. 5,887,723 discloses a foldable jacket for a general purpose portable computer that includes a first protective panel having first and second sub-panels foldably connected along a first fold line. The first sub-panel has a fastener for fastening to the computer. A second protective panel is foldably connected to the first protective panel along a second fold line. A third protective panel is foldably connected to the second protective panel along a third fold line. A strap extending from the first sub-panel is capable of fastening to the third panel to secure the jacket substantially around the computer with the first and second sub-panels lying along the same plane. The jacket is also capable of being folded along the first and second fold lines such that the first and second sub-panels are at an angle relative to each other as well as the third panel. The first sub-panel is fastened to the third panel at an angle to tilt the computer for viewing and use.

U.S. Pat. No. 5,607,054 discloses a folio carrying case for a notebook computer. The carrying case includes front and back panels configured to cover opposite sides of the notebook computer, a top panel flexibly connecting top edges of the front and back panels, a bottom panel flexibly connected to a bottom edge of the back panel, a closure flap flexibly connected to a bottom edge of the bottom panel and overlapping a bottom edge of the front cover when the carrying case is in a closed position folded around the notebook computer, and a pair of tabs depending from opposed lateral edges of the front panel toward the back panel when the carrying is in a closed position. In the closed position, the carrying case serves as a folio to protectively cover the notebook computer and, in an open position, can also serve as a computer stand supporting the notebook computer in an ergonomic position.

U.S. Patent Application Publication No. 2006/0285283 discloses a system, apparatus, and method for portable computing systems that simply and efficiently address poor ergonomics, heat buildup, and/or electromagnetic radiation, most preferably in one integrated solution. The apparatus includes: a unitary blank of a substantially planar rigid sheet material including a plurality of panel portions interdivided by one or more bending line portions, wherein the unitary blank folds along the one or more bending line portions to produce a three-dimensional structure that supports a portable electronic device on at least one panel portion over a surface at an angle inclined relative to the surface; and a fastening subsystem, coupled to the unitary blank, having a holding mode for maintaining the unitary blank folded in the three-dimensional structure and a release mode for transitioning the three-dimensional structure to a planar structure, the fastening subsystem providing for repeatable transitions between the holding mode and the release mode.

SUMMARY OF THE INVENTION

The object of the present invention is to provide an electronic device storage/carrying case with a novel configuration. The electronic device storage/carrying case is adapted for supporting an electronic device via supporting components, one of which also serves as a handle of the electronic device storage/carrying case when the electronic device is stored in the electronic device storage/carrying case.

Accordingly, an electronic device storage/carrying case of this invention is adapted for storing, carrying and supporting an electronic device, and comprises a case body, a first supporting component, and a second supporting component. The case body defines a storage space for storing the electronic device, and includes a front wall formed with an opening. The first supporting component is pivoted to the case body and is pivotable upwardly relative to the case body to a propping position for supporting the electronic device, and downwardly relative to the case body to a storing position, where the first supporting component is stored in the case body. The second supporting component is connected movably to the case body and is movable between a carrying position, where the second supporting component extends outwardly of the case body via the opening in the front wall serving as a handle that allows carrying of the electronic device, and a supporting position, where the second supporting component is disposed in the storage space and permits the electronic device to abut thereagainst.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
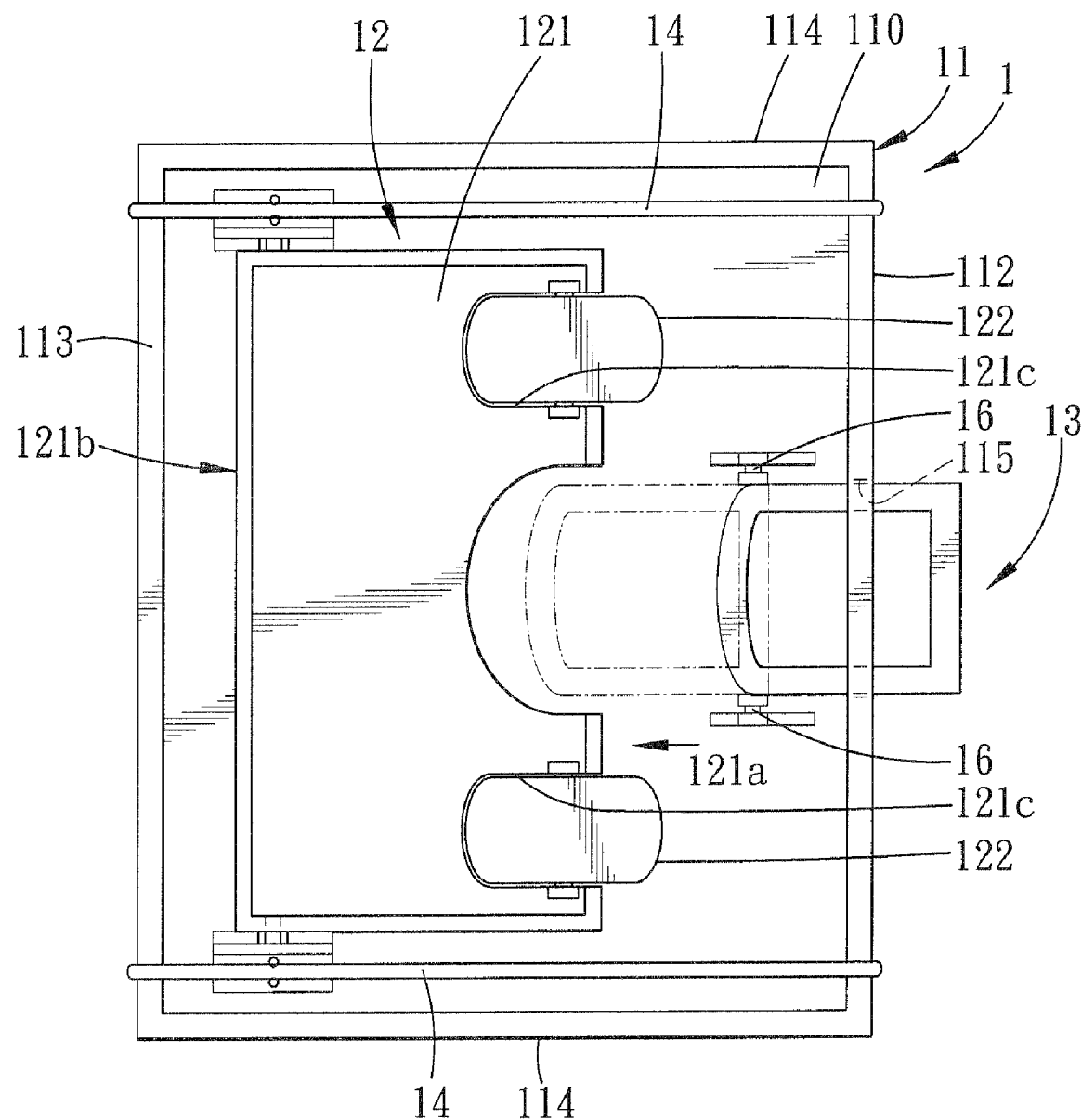
FIG. 1 is a top view of a preferred embodiment of an electronic device storage/carrying case according to the present invention.
Figure 2:
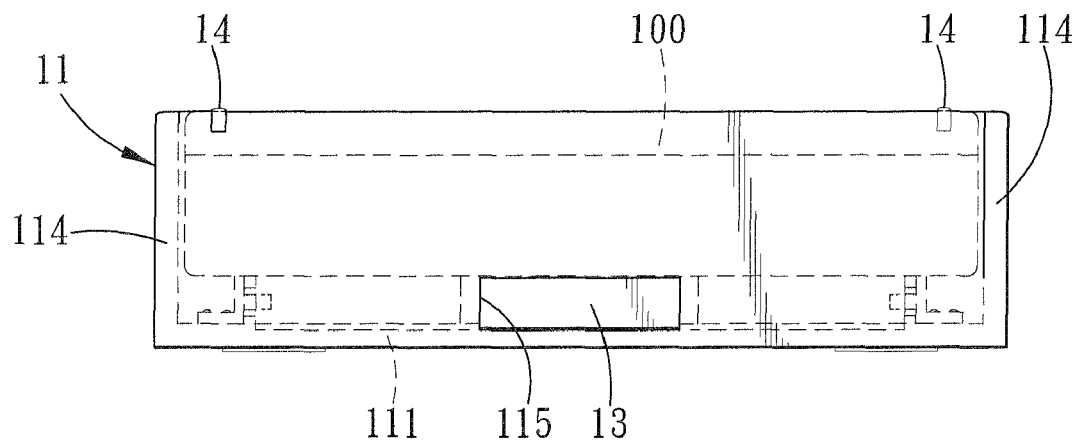
FIG. 2 is a front view of the preferred embodiment.

Referring to FIGS. 1 to 4, the preferred embodiment of an electronic device storage/carrying case 1 of the present invention includes a case body 11, a first supporting component 12, and a second supporting component 13. The case body 11 is adapted for storing an electronic device 100, and the second supporting component 13 serves as a handle of the storage/carrying case 1. Moreover, the first and second supporting components 12, 13 are configured to support the electronic device 100, such that it is convenient for a user to use the electronic device 100. In this embodiment, the electronic device 100 is a notebook computer.

In this embodiment, the case body 11 has a configuration of an uncovered box and includes a front wall 112 formed with an opening 115, a rear wall 113, a pair of opposite side walls 114, and a bottom wall 111 connected to bottom edges of the front, rear, and side walls 112, 113, 114. The front wall 112, the rear wall 113 and the side walls 114 cooperate with the bottom wall 111 to define a storage space 110 for storing the electronic device 100.

The first supporting component 12 is pivoted to the case body 11 and is pivotable upwardly relative to the case body 11 to a propping position (see FIG. 4) for supporting the electronic device 100, and downwardly relative to the case body 11 to a storing position (see FIG. 3), where the first supporting component 12 is stored in the case body 11.

In this embodiment, the first supporting component 12 includes a first supporting portion 121 and a pair of second supporting portions 122 pivoted to the first supporting portion 121. Preferably, the first supporting portion 121 is in a form of a plate and has a front end (121a) formed with a pair of notches (121c), and a rear end (121b) pivotally connected to the bottom wall 111. Each of the second supporting portions 122 is pivoted to the first supporting portion 121 at a respective one of the notches (121c) in the front end (121a) of the first supporting portion 121.

Preferably, the electronic device storage/carrying case 1 further includes a pair of slide slot components 15 and a pair of shaft components 16. One of the pair of the slide slot components 15 and the pair of the shaft components 16 are disposed in the case body 11 adjacent to lateral ends of the opening 115. The other one of the pair of the slide slot components 15 and the pair of the shaft components 16 are provided at opposite side surfaces of the second supporting component 13. The slide slot components 15 and the shaft components 16 are in sliding engagement with each other.

Figure 3:
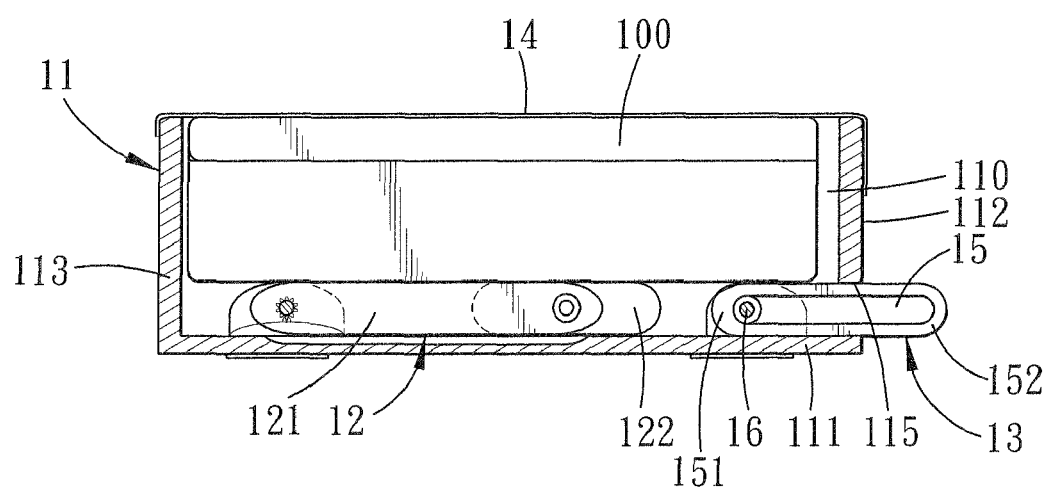
FIG. 3 is a partly sectional, schematic side view of the preferred embodiment, illustrating a first supporting component at a storing position and a second supporting component at a carrying position.
Figure 4:
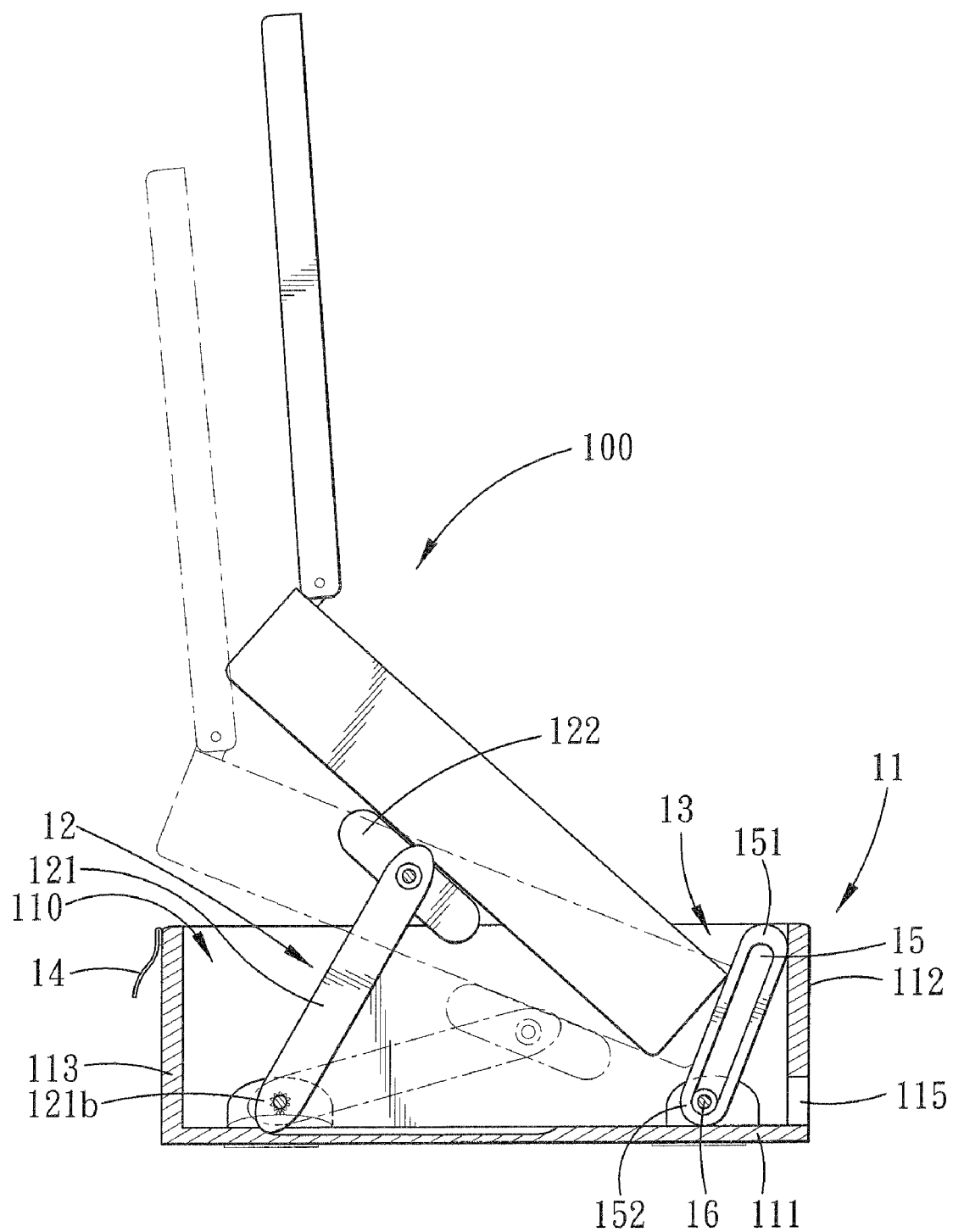
FIG. 4 is a partly sectional, schematic side view of the preferred embodiment, illustrating the first supporting component at a propping position and the second supporting component at a supporting position.

In this embodiment, the second supporting component 13 is in a shape of a rectangular loop. The slide slot components 15 are respectively provided at the opposite side surfaces of the second supporting component 13, and extend in a longitudinal direction. The shaft components 16 are disposed in the case body 11 and are respectively adjacent to the lateral ends of the opening 115. By virtue of the sliding engagement between the slide slot components 15 and the shaft components 16, the second supporting component 13 is connected movably to the case body 11, and is movable between a carrying position and a supporting position. As shown in FIGS. 1 and 3, the second supporting component 13 extends outwardly of the case body 11 via the opening 115 in the front wall 112, and serves as the handle of the storage/carrying case 1 when the second supporting component 13 is at the carrying position. As shown in FIG. 4, the second supporting component 13 is disposed in the storage space 110 and permits the electronic device 100 to abut thereagainst when the second supporting component 13 is at the supporting position.

In practice, the shaft components 16 can be provided at the opposite side surfaces of the second supporting component 13, and the slide slot components 15 can be disposed in the case body 11 such that they are respectively adjacent to the lateral ends of the opening 115 in other embodiments of this invention.

Preferably, the electronic device storage/carrying case 1 further includes a pair of binding straps 14 that are connected to the case body 11 and that extend over the storage space 110 for limiting the electronic device 100 in the storage space 110. In this embodiment, one end of each of the binding straps 14 is connected to the rear wall 113 of the case body 11, and the other end of each of the binding straps 14 is connected separably to the front wall 112 by means of buttons, hook-and-loop fasteners, etc. While the binding straps 14 extend over the storage space 110 in the front-rear direction in this embodiment, the binding straps 14 can extend over the storage space 110 in a left-right direction or an inclined direction in other embodiments of this invention.

Referring to FIG. 3, when the electronic device 100 is stored in the storage space 110 in the case body 11, the first supporting component 12 lies on the bottom wall 111 of the case body 11 under the electronic device 100, i.e., the first supporting component 12 is at the storing position. The second supporting component 13 also lies on the bottom wall 111 under the electronic device 100 at this time. Further, the second supporting component 13 is adapted to be pulled outwardly of the case body 11 via the opening 115 in the front wall 112. At this time, the second supporting component 13 is at the carrying position and serves as the handle of the storage/carrying case 1, and the shaft components 16 are respectively disposed in first end parts 151 of the slide slot components 15. Moreover, the binding straps 14 extend over the storage space 110 for limiting the electronic device 100 in the storage space 110. It should be noted that, instead of the binding straps 14, a cover plate partially connected to the case body 11 can be used for covering the case body 11 in other embodiments of the invention.

Referring to FIG. 4, when it is desired to support the electronic device 100 via the first and second supporting components 12, 13, the first supporting portion 121 of the first supporting component 12 is pivoted upwardly relative to the case body 11, and inclines upwardly at an angle relative to the bottom wall 111. Then, the second supporting portions 122 of the first supporting component 12 are adjusted to a suitable angle relative to the first supporting portion 121 to abut against a bottom portion of the electronic device 100, thereby placing the first supporting component 12 at the propping position for supporting the electronic device 100. Regarding the second supporting component 13, the second supporting component 13 is first retracted into the storage space 110 in the case body 11. Then, the second supporting component 13 is pivoted upwardly and forwardly to the case body 11 so as to lean against the front wall 112 of the case body 11. At this time, the shaft components 16 are respectively disposed in second end parts 152 of the slide slot components 15, and the first end parts 151 of the slide slot components 15 lean against the front wall 112. The second supporting component 13 is at the supporting position at this time, and provides a supporting surface that inclines upwardly and forwardly relative to the bottom wall 111. A front edge of the electronic device 100 abuts against the supporting surface provided by the second supporting component 13, and the electronic device 100 is presented an inclined position whereat a rear portion thereof is higher than a front portion thereof.

It should be noted that the mechanism of the pivot connection between the rear end (121b) of the first supporting portion 121 and the bottom wall 111 is configured to permit the first supporting portion 121 to stay at a desired angle so as to prevent the first component 12 from undesired pivoting that can lead to unstable support for the electronic device 100.

Moreover, the second supporting component 13 is movable between the carrying position and the supporting position via cooperation between the slide slot components 15 and the shaft components 16. However, the connection between the second supporting component 13 and the case body 11 is not limited to the disclosure herein. Any mechanism that permits the second supporting component 13 to move into and extend out the case body 11, and to adjust to a desired angle for supporting the electronic device 100 can be used without departing from the scope of the present invention.

In sum, the configuration of the first and second supporting components 12, 13 for supporting the electronic device 100 is different from conventional means. The second supporting component 13 can also extend outwardly of the case body 11 and serve as the handle of the storage/carrying case 1 when the electronic device 100 is stored in the case body 11.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic device storage/carrying case adapted for storing, carrying and supporting an electronic device, said electronic device storage/carrying case comprising:
   a case body that defines a storage space for storing the electronic device, and that includes a front wall formed with an opening;
   a first supporting component pivoted to said case body and pivotable upwardly relative to said case body to a propping position for supporting the electronic device, and downwardly relative to said case body to a storing position, where said first supporting component is stored in said case body; and
   a second supporting component connected movably to said case body and movable between a carrying position, where said second supporting component extends outwardly of said case body via said opening in said front wall to serve as a handle of said electronic device storage/carrying case, and a supporting position, where said second supporting component is disposed in said storage space, ceases to extend into said opening in said front wall, and permits the electronic device to abut thereagainst.

2. The electronic device storage/carrying case as claimed in claim 1, wherein said second supporting component has a pair of opposite side surfaces, said opening in said front wall of said case body has a pair of opposite lateral ends, and said electronic device storage/carrying case further comprises a pair of slide slot components and a pair of shaft components, one of said pair of said slide slot components and said pair of said shaft components being disposed in said case body adjacent to said lateral ends of said opening, the other one of said pair of said slide slot components and said pair of said shaft components being provided at said opposite side surfaces of said second supporting component and being in sliding engagement with said one of said pair of said slide slot components and said pair of said shaft components.

3. The electronic device storage/carrying case as claimed in claim 2, wherein:
   said shaft components are disposed in said case body and are respectively adjacent to said lateral ends of said opening;
   said slide slot components are respectively provided at said opposite side surfaces of said second supporting component, extend in a longitudinal direction, and have first and second end parts opposite to each other in the longitudinal direction;
   said shaft components are respectively disposed in said first end parts of said slide slot components when said second supporting component is at the carrying position; and
   said shaft components are respectively disposed in said second end parts of said slide slot components, and said first end parts of said slide slot components lean against said front wall of said case body when said second supporting component is at the supporting position.

4. The electronic device storage/carrying case as claimed in claim 1, wherein:
   said front wall has a bottom edge, and said case body further includes a bottom wall connected to said bottom edge of said front wall;
   said first supporting component includes a first supporting portion pivoted to said case body, and a second supporting portion pivoted to said first supporting portion;
   said first supporting portion inclines upwardly at an angle relative to said bottom wall, and said second supporting portion is disposed to abut against a bottom portion of the electronic device when said first supporting component is at the propping position; and
   said first supporting component lies on said bottom wall when said first supporting component is at the storing position.

5. The electronic device storage/carrying case as claimed in claim 4, wherein said first supporting portion of said first supporting component is in a form of a plate and has a rear end pivotally connected to said bottom wall, and a front end pivotally connected to said second supporting portion.

6. The electronic device storage/carrying case as claimed in claim 1, wherein said second supporting component is in a shape of a loop.

7. The electronic device storage/carrying case as claimed in claim 1, further comprising a binding strap that is connected to said case body and that extends over said storage space for limiting the electronic device in said storage space.

8. An electronic device storage/carrying case comprising:
   a case body that defines a storage space, and that includes a front wall formed with an opening and having a bottom edge, and a bottom wall connected to said bottom edge of said front wall;
   a first supporting component pivoted to said case body and pivotable downwardly to lie on said bottom wall, and upwardly to form an angle relative to said bottom wall; and
   a second supporting component connected movably to said case body and disposed forwardly of said first supporting component, said second supporting component being movable between a carrying position, where said second supporting component extends outwardly of said case body via said opening in said front wall to serve as a handle of said electronic device storage/carrying case, and a supporting position, where said second supporting component is disposed in said storage space, ceases to extends into said opening in said front wall, and provides a supporting surface that inclines upwardly and forwardly relative to said bottom wall.

9. The electronic device storage/carrying case as claimed in claim 8, wherein said second supporting component has a pair of opposite side surfaces, said opening in said front wall of said case body has a pair of opposite lateral ends, and said electronic device storage/carrying case further comprises a pair of slide slot components and a pair of shaft components, one of said pair of said slide slot components and said pair of said shaft components being disposed in said case body adjacent to said lateral ends of said opening, the other one of said pair of said slide slot components and said pair of said shaft components being provided at said opposite side surfaces of said second supporting component and being in sliding engagement with said one of said pair of said slide slot components and said pair of said shaft components.

10. The electronic device storage/carrying case as claimed in claim 9, wherein:
   said shaft components are disposed in said case body and are respectively adjacent to said lateral ends of said opening;

said slide slot components are respectively provided at said opposite side surfaces of said second supporting component, extend in a longitudinal direction, and have first and second end parts opposite to each other in the longitudinal direction;

said shaft components are respectively disposed in said first end parts of said slide slot components when said second supporting component is at the carrying position; and said shaft components are respectively disposed in said second end parts of said slide slot components, and said first end parts of said slide slot components lean against said front wall of said case body when said second supporting component is at the supporting position.

11. The electronic device storage/carrying case as claimed in claim 8, wherein said first supporting component includes a first supporting portion pivoted to said case body and pivotable relative to said bottom wall, and a second supporting portion pivoted to said first supporting portion.

12. The electronic device storage/carrying case as claimed in claim 11, wherein said first supporting portion of said first supporting component is in a form of a plate and has a rear end pivotally connected to said bottom wall, and a front end pivotally connected to said second supporting portion.

13. The electronic device storage/carrying case as claimed in claim 8, wherein said second supporting component is in a shape of a loop.

14. The electronic device storage/carrying case as claimed in claim 8, further comprising a binding strap that is connected to said case body and that extends over said storage space.

* * * * *